(12) United States Patent
Stavens et al.

(10) Patent No.: US 7,875,685 B2
(45) Date of Patent: *Jan. 25, 2011

(54) GAS PHASE POLYMERIZATION AND DISTRIBUTOR PLATE PASSIVATION TREATMENT

(75) Inventors: Kevin B. Stavens, Seabrook, TX (US); Matthew W. Holtcamp, Huffman, TX (US); Gary D. Mohr, Houston, TX (US); William A. Lamberti, Stewartsville, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 441 days.

This patent is subject to a terminal disclaimer.

(21) Appl. No.: 11/936,604

(22) Filed: Nov. 7, 2007

(65) Prior Publication Data

US 2009/0118443 A1    May 7, 2009

(51) Int. Cl.
C08F 2/34      (2006.01)
B01J 8/44      (2006.01)
C08F 4/69      (2006.01)

(52) U.S. Cl. .................. 526/62; 526/901; 422/143; 428/461; 428/469; 34/582

(58) Field of Classification Search .................. 526/62, 526/901; 34/582; 422/143; 428/461, 469
See application file for complete search history.

(56) References Cited

U.S. PATENT DOCUMENTS

| | | | |
|---|---|---|---|
| 4,532,311 A | 7/1985 | Fulks et al. | |
| 4,792,592 A | 12/1988 | Fulks et al. | |
| 4,876,320 A | 10/1989 | Fulks et al. | |
| 5,548,040 A * | 8/1996 | Cann et al. | 526/62 |
| 5,834,571 A | 11/1998 | Bernier et al. | |
| 6,114,475 A * | 9/2000 | Goode et al. | 526/62 |
| 6,335,402 B1 | 1/2002 | Mihan et al. | |
| 6,831,140 B2 * | 12/2004 | Muhle et al. | 526/74 |

FOREIGN PATENT DOCUMENTS

| | | |
|---|---|---|
| EP | 0 942 009 | 9/1999 |
| WO | WO 97/49771 | 12/1997 |
| WO | WO 2004/029098 | 4/2004 |
| WO | WO 2008/070124 | 6/2008 |
| WO | WO 2008/108931 | 9/2008 |

OTHER PUBLICATIONS

Author: Anonymous, *Fouling Reduction in a Gas-phase Polymerization Reactor*, Research Disclosure, Mason Publications, Feb. 1, 1984, vol. 238, No. 3 (Abstract).

* cited by examiner

*Primary Examiner*—Fred M Teskin

(57) ABSTRACT

Apparatus and methods for gas phase polymerization are provided. The method can include polymerizing one or more olefins at gas phase conditions in a reactor comprising one or more process exposed surfaces in the presence of a catalyst system; and treating at least a portion of the one or more process exposed surfaces prior to injecting the catalyst system to reduce the number of surface hydroxyls or access of the catalyst system to the surface hydroxyls on the process exposed surfaces.

33 Claims, 2 Drawing Sheets

GAS PHASE POLYMERIZATION AND DISTRIBUTOR PLATE PASSIVATION TREATMENT

BACKGROUND OF THE INVENTION

1. Field of the Invention

Embodiments of the present invention generally relate to gas phase olefin polymerization. More particularly, embodiments relate to chemical passivation and/or coating treatments for gas phase polymerization.

2. Description of the Related Art

Gas phase polymerization converts a gaseous monomer into granular solids. The gaseous monomer, and optional comonomer, is introduced under pressure into a reaction vessel, i.e. reactor, containing a catalyst and optional activator. Once polymerization begins, the monomer molecules diffuse to the growing polymer chains within the reactor. The resulting polymer is obtained as a granular solid which is fluidized within the reactor with the monomer and catalyst.

Gas phase polymerization is particularly prone to depositing solid particles on the reactor walls and other process exposed surfaces of the reactor due to static charge or electrical attraction between a metal surface and the polymer. Over time, the solids can accumulate and grow to form a solid sheet of polymer on the metal, such as a reactor wall or internal distribution plate, injection nozzle or product discharge nozzle. This phenomenon is common in the art and is known as "sheeting" when the polymer forms on a wall of the reactor, or "plugging" when the polymer forms on the distributor plate or nozzles and blocks the flow of fluid therethrough.

Polymer sheets on the walls of the reactor can grow in height and thickness to the point where the weight of the sheet overcomes any attractive forces between the sheet and the metal and falls to the bottom of the reactor. Solid polymer can also grow to an appreciable thickness to plug or block fluid flow paths on the nozzles or distribution plate. In either case, the solid polymer can plug or block monomer injection, catalyst injection, and/or product discharge. The solid polymer can also inhibit or interfere with fluidization within the reactor. As a result, the polymer product can become off spec and/or polymerization can come to a stop. To remove the solid polymer, the reactor is usually purged and shut down, which is both costly and time-consuming.

Certain pretreatment techniques have been used to prevent or control sheeting or plugging within the reactor. For example, a liquid catalyst has been sprayed onto the walls of the reactor and reacted with the monomer to produce a polymer coating or layer on the reactor wall that serves as an insulation layer to prevent product polymer growth thereon. Such technique is described in more detail in U.S. Pat. Nos. 4,532,311, 4,792,592, and 4,876,320. However, such techniques also grow solid polymer on injection nozzles and the gas distribution plate thereby inhibiting or plugging the gas flow through the reactor as discussed above. Such polymer then has to be removed before product polymerization can commence.

To remove the unwanted polymer, the reactor has to be purged before the nozzles and the gas distribution plate can be cleaned, which can consume several more days of reactor down time. However, certain areas or places on the distribution plate and nozzle are not accessible to be easily cleaned so polymer growth is left behind to accumulate and become a bigger burden over time.

There is a need, therefore, for an improved passivation and/or coating treatment for gas phase polymerization that can reduce undesired polymer growth and/or adhesion within a reactor or reactor system.

SUMMARY OF THE INVENTION

Apparatus and methods for gas phase polymerization are provided. In at least one specific embodiment, the method includes polymerizing one or more olefins at gas phase conditions in a reactor comprising one or more process exposed surfaces in the presence of a catalyst system; and treating at least a portion of the one or more process exposed surfaces prior to injecting the catalyst system to reduce the number of surface hydroxyls or access of the catalyst system to the surface hydroxyls on the process exposed surfaces.

In at least one other specific embodiment, the method includes polymerizing, in a gas phase reactor, one or more olefins in the presence of a catalyst system comprising one or more chromocene catalysts to provide a polymer coating therein; treating one or more process exposed surfaces prior to polymerizing with the catalyst system to reduce or eliminate polymer growth on the treated surface; and polymerizing the one or more olefins in the presence of a metallocene or Ziegler-Natta catalyst system.

In at least one other specific embodiment, a method for reducing fouling in a gas phase polymerization reactor is provided. The method can include treating a bare metal, process exposed surface to reduce the number of accessible hydroxyl groups by 50% or more; and then polymerizing one or more olefins in the presence of a chromocene at gas phase conditions to provide a polymer coating on untreated process exposed surface surfaces, and optionally on the treated surfaces.

In at least one specific embodiment, the apparatus can include a body having one or more apertures formed therethrough; and one or more flow diverter devices disposed on the body, wherein each flow diverter device is disposed above a centerline of each aperture, and at least one surface of each flow diverter device is treated with a passivation layer comprising a zinc containing compound or a hydrocarbon-containing compound that is non-volatile at gas phase conditions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
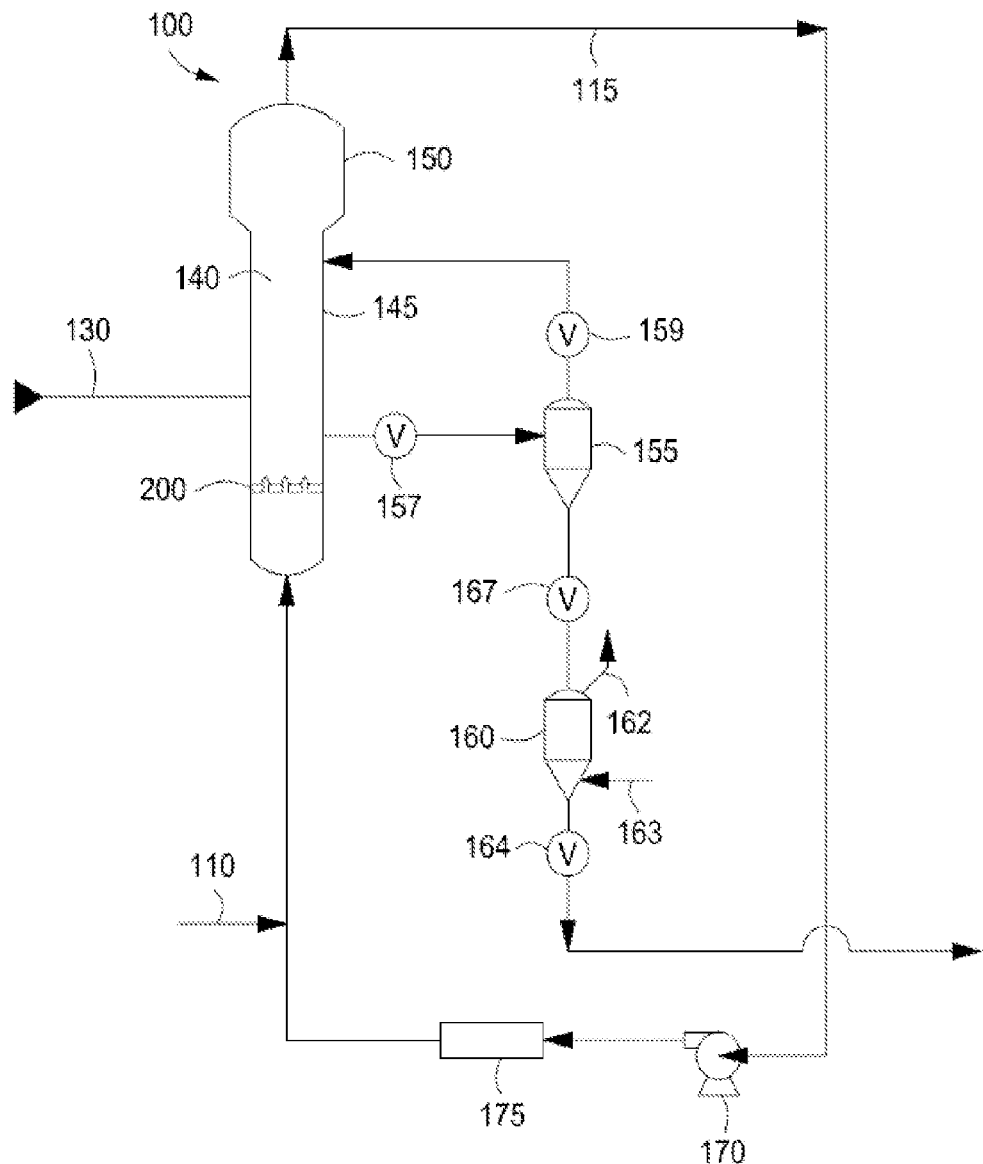
FIG. 1 depicts an illustrative gas phase system for making polyolefin, according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

In one or more embodiments, a reactor for gas phase polymerization can be treated with a catalyst system, such as a chromium-containing catalyst, to polymerize one or more olefins at gas phase conditions to deposit a layer of the polymer ("polymer coating") therein. The catalyst can be injected, sprayed or otherwise introduced into the reactor as a solution or suspension so that the catalyst can deposit on one or more process exposed surfaces and be supported thereon. In one or more embodiments, the deposited catalyst can be "oxidized" by injecting oxygen into the reactor before introducing a cocatalyst and one or more olefins to form the polymer coating. The cocatalyst can be an alkyl aluminum compound, such as tri-ethylaluminum (TEAL).

The term "gas phase conditions" as used herein refers to temperatures and pressures suitable for polymerizing one or more gaseous phase olefins to produce polymer therefrom. The conditions for gas phase polymerization can vary depending upon the olefins to be polymerized, catalysts, and catalyst systems. The specific conditions are known or readily derivable by those skilled in the art. For example, temperature can range of from about −10° C. to about 120° C., often about 15° C. to about 110° C., and pressure can range of from about 0.1 bar to about 100 bar, such as about 5 bar to about 50 bar, for example. Additional details of suitable gas phase polymerization conditions can be found in U.S. Pat. No. 6,627,713.

The polymer coating can have low porosity and low permeability or high porosity and high permeability. In one or more embodiments, the polymer coating is a higher molecular weight polymer (e.g. weight average molecular weight (Mw) of at least 200,000) having a thickness that is permeable to the subsequent reactants (i.e. commercial catalyst and monomer) for polymerizing the commercial product. For example, the polymer coating can have a thickness less than 10 mils (0.24 mm) or less than 5 mils (0.12 mm).

Prior to depositing the polymer coating, the process exposed surfaces of the reactor system that are prone to blocking or plugging due to the polymer growth can be passivated or otherwise treated so that the polymer coating will not adhere or attach thereto. This passivation step can convert the process exposed surfaces to a non-reactive surface, preventing the chromium-containing catalyst from reacting therewith, and thus, reducing or eliminating the formation of a highly active polymerization catalyst that can grow polymer.

The term "process exposed surface" as used herein, refers to any metallic surface within the reactor system that can contact active catalyst and monomer. A process exposed surface can include, but is not limited to the inner surfaces of the side walls, inner surface of the dome, injection nozzles, injection tubes, compressors, heat exchanger, process piping, instrumentations, man ways, and distribution plates. Not wishing to be bound by theory, it is believed that those process exposed surfaces of the reactor are made of carbon steel or iron, which have a tendency to oxidize and rust over time, especially when the reactor is opened to the atmosphere for maintenance and/or cleaning. Such oxidation on the process exposed surfaces provides higher surface area and increased amounts of metal oxide and hydroxyl groups that can react with the chromium-containing catalyst to form a highly active chemisorbed polymerization catalyst. Such oxidation on the process exposed surfaces also provides a rough surface that serves as a support for the chromium-containing catalyst system allowing the catalyst to reside thereon.

For iron-containing process exposed surfaces, oxidation affects the amount of chemisorbed catalyst such as chromocene-derived moieties, poised for subsequent activation and polymerization. Since higher oxidation levels will increase surface area and hydroxyl content for a given surface, these contribute to the reaction of $Cp_2Cr$ with $Fe_x$—$O_y$—OH species. Thus, reducing or eliminating iron oxidation and/or iron hydroxyl concentration on process exposed surfaces can reduce or eliminate polymer formation on those surfaces resulting from the chromocene treatment.

The passivation step can reduce or eliminate oxidation and/or iron hydroxyl concentration to prevent unwanted polymer growth thereon. In one or more embodiments, the passivation step can reduce or eliminate oxidation and/or iron hydroxyl concentration by chemical passivation techniques or physical passivation techniques. Suitable chemical passivation techniques will be able to change or alter the chemical affinity between the catalyst and the oxidized surface, thereby preventing polymer growth thereon. Suitable physical passivation techniques will be able to change or alter the physical affinity between the polymer growth and the oxidized surface, thereby preventing the polymer growth from sticking and accumulating. Suitable chemical and physical passivation techniques will also be able to reduce the number of available hydroxyl and/or the activity of the chromium catalyst supported on an iron-oxidized surface.

In one or more embodiments, the passivation step can include depositing or otherwise applying a process inert material or layer of material on at least a portion of the process exposed surface to be protected. In one or more embodiments, a corrosion inhibiting layer can be applied to at least a portion of the one or more process exposed surfaces. The corrosion inhibiting layer can include one or more refractory (i.e. non-reactive) materials. For example, the corrosion inhibiting layer can include one or more non-iron metals and/or non-iron metal alloys. The corrosion inhibiting layer can include one or more ceramics and/or silicas. Preferably, the refractory material can self-passivate. For example, the corrosion inhibiting layer can include zinc which can be oxidized to form a thin surface layer of zinc oxide. The zinc oxide provides a protective layer on the surface to be protected so that it passivates the underlying surface against further oxidation.

In one or more embodiments, a process exposed surface can be polished or smoothed to prevent the polymer from sticking thereto. Polished iron and steel surfaces tend to oxidize less rapidly than gritblasted steel surfaces, thus polished steel surfaces can also present lower levels of oxidation for a given amount of air-moisture exposure. Polished or smoothed surfaces also result in lower amounts of surface oxidation that can lead to an active catalyst subsequently depositing thereon, and thus less polymer formation on this surface, leading to reduced fouling.

In one or more embodiments, the passivation step can include applying a low adhesion coating on at least a portion of the process exposed surface to be protected. The low adhesion coating or layer can include one or more materials having a stronger or better adhesion to the coating polymer than the underlying metal oxide(s). Illustrative materials can include a thin polyethylene film such as polytetrafluoroethylene (PTFE) or commercially known as Teflon®, oil, and/or a non-volatile hydrocarbon-containing compound. Suitable non-volatile, hydrocarbon-containing compounds can include a halogen substituted or a silicon-containing hydrocarbon grease.

In at least one specific embodiment, the low adhesion coating can be applied on top of the corrosion inhibiting layer and/or on the smoothed/polished surface. In the event the chromium-containing catalyst did collect on the low adhesion coating layer on either the corrosion inhibiting layer or smoothed internal and produce polymer, the low adhesion layer would allow for easy cleaning because the low adhesion material having the polymer coating thereon can be easily separated or otherwise removed from the underlying coating or process exposed surface.

Once the polymer coating deposition is complete, reaction conditions can be changed in the reactor and another catalyst system can be introduced to polymerize one or more olefins to provide a product polymer ("commercial product"). The one or more olefins (i.e. monomers) to provide the product polymer can be same as the one or more olefins for polymerizing the thin polymer coating. Examples of suitable olefins include ethylene, propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1, 3-methyl-pentene-1, 3,5,5-trimethyl hexene-1. Preferably, the olefin is or includes ethylene. In one or more embodiments, the olefin is or includes propylene. A commoner is optional and can be selected from butene, hexene, octene, and combinations thereof.

FIG. 1 depicts an illustrative gas phase system for making polyolefin, according to one or more embodiments. As depicted, the system 100 can include a reactor 140 in fluid communication with one or more discharge tanks 155 (only one shown), surge tanks 160 (only one shown), recycle compressors 170 (only one shown), and heat exchangers 175 (only one shown). The polymerization system 100 can also include more than one reactor 140 arranged in series, parallel, or configured independent from the other reactors, each reactor having its own associated tanks 155, 160, compressors 170, recycle compressors 170, and heat exchangers 175 or alternatively, sharing any one or more of the associated tanks 155, 160, compressors 170, recycle compressors 170, and heat exchangers 175. For simplicity and ease of description, embodiments of the invention will be further described in the context of a single reactor train. In one or more embodiments, the reactor 140 can include a reaction zone 145 in fluid communication with a velocity reduction zone 150. The reaction zone 145 can include a bed of growing polymer particles, formed polymer particles and catalyst particles fluidized by the continuous flow of polymerizable and modifying gaseous components in the form of make-up feed and recycle fluid through the reaction zone 145.

A feed stream or make-up stream 110 can be introduced into the polymerization system at any point. For example, the feed stream or make-up stream 110 can be introduced to the reactor fluid bed in the reaction zone 145 or to the expanded section 150 or to any point within the recycle stream 115. Preferably, the feed stream or make-up stream 110 is introduced to the recycle stream 115 before or after the heat exchanger 175. In FIG. 1, the feed stream or make-up stream 110 is depicted entering the recycle stream 115 after the cooler 175.

The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, butene, pentene, 4-methyl-1-pentene, hexene, octene, decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream can further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 145, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

The velocity reduction zone 150 has a larger inner diameter than the reaction zone 145. As the name suggests, the velocity reduction zone 150 slows the velocity of the gas due to the increased cross sectional area. This reduction in gas velocity allows particles entrained in the upward moving gas to fall back into the bed, allowing primarily only gas to exit overhead of the reactor 140 through recycle gas stream 115.

The recycle stream 115 can be compressed in the compressor/compressor 170 and then passed through the heat exchanger 175 where heat is removed before it is returned to the bed. The heat exchanger 175 can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream 115 is returned to the reactor 140. The cooled recycle stream absorbs the heat of reaction generated by the polymerization reaction. Condensing mode operation such as disclosed in U.S. Pat. Nos. 4,543,399 and 4,588,790 can also be used to assist in heat removal from the reactor 140. Preferably, the recycle stream 115 is returned to the reactor 140 and to the fluidized bed through a gas distribution plate 200. The gas distribution plate 200 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in more detail below with reference to FIGS. 2 and 3.

A catalyst or catalyst system can be introduced to the fluidized bed within the reactor 140 through the one or more injection nozzles in fluid communication with stream 130. The catalyst or catalyst system can be introduced as preformed particles in one or more liquid carriers (i.e., a catalyst slurry). Suitable liquid carriers include mineral oil and liquid hydrocarbons including but not limited to propane, butane, isopentane, hexane, heptane and octane, or mixtures thereof. A gas that is inert to the catalyst slurry such as, for example, nitrogen or argon can also be used to carry the catalyst slurry into the reactor 140. In one or more embodiments, the catalyst or catalyst system can be a dry powder. In one or more embodiments, the catalyst or catalyst system can be dissolved in the liquid carrier and introduced to the reactor 140 as a solution.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

The conditions for polymerizations vary depending upon the monomers, catalysts, catalyst systems, and equipment availability. The specific conditions are known or readily derivable by those skilled in the art. For example, the temperatures are within the range of from about $-10°$ C. to about $120°$ C., often about $15°$ C. to about $110°$ C. Pressures are within the range of from about 0.1 bar to about 100 bar, such as about 5 bar to about 50 bar, for example. Additional details of polymerization can be found in U.S. Pat. No. 6,627,713, which is incorporated by reference at least to the extent it discloses polymerization details.

On discharge of polymer product from reactor 140, it is desirable and preferable to separate fluid from the product and to return the fluid to the recycle line 115. In one or more embodiments, this separation is accomplished when fluid and product leave the reactor 140 and enter the product discharge tanks 155 (one is shown) through valve 157, which can be a ball valve designed to have minimum restriction to flow when opened. Positioned above and below the product discharge tank 155 are conventional valves 159, 167. The valve 167 allows passage of product into the product surge tanks 160 (only one is shown).

In at least one embodiment, to discharge particulate polymer from reactor 140, valve 157 is opened while valves 159, 167 are in a closed position. Product and fluid enter the product discharge tank 155. Valve 157 is closed and the product is allowed to settle in the product discharge tank 155. Valve 159 is then opened permitting fluid to flow from the product discharge tank 155 to the reactor 140. Valve 159 is then closed and valve 167 is opened and any product in the product discharge tank 155 flows into the product surge tank 160. Valve 167 is then closed. Product is then discharged from the product surge tank 160 through valve 164. The product can be further purged via purge stream 163 to remove residual hydrocarbons and conveyed to a pelletizing system or to storage (not shown). The particular timing sequence of the valves 157, 159, 167, 164 is accomplished by the use of conventional programmable controllers which are well known in the art.

Another preferred product discharge system which can be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

Figure 2:
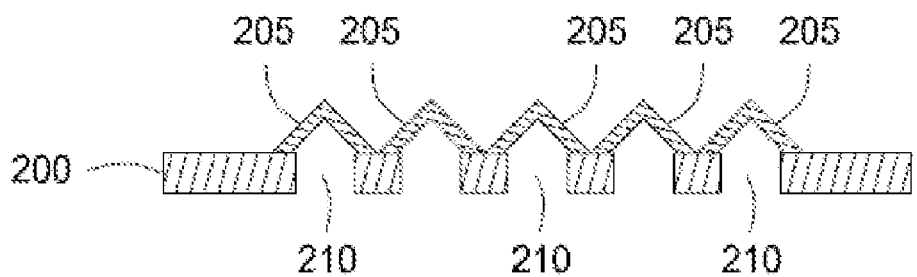
FIG. 2 depicts a partial cross section of an illustrative distribution plate, according to one or more embodiments described.
Figure 3:
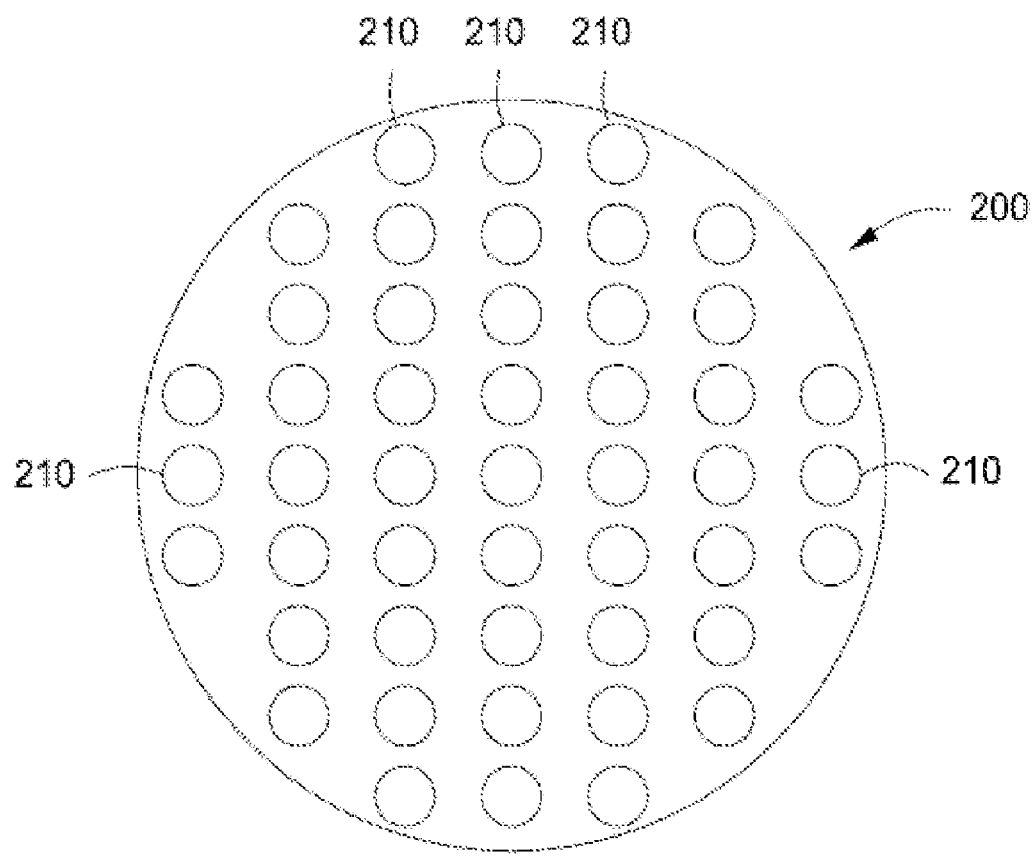
FIG. 3 depicts an illustrative plan view of the distribution plate in FIG. 2 with the flow diverter devices or tee pees removed.

FIG. 2 depicts a partial cross section of an illustrative distribution plate 200, according to one or more embodiments described. The plate 200 can include a body having one or more apertures or holes ("flow paths") 210 formed therethrough and one or more flow diverter devices 205 disposed thereon. Each flow diverter device 205 can be disposed about each hole 210. The term "flow diverter device" refers to any device or component adapted to divert flow and can include caps, tee pees, baffles, and deflectors. The flow diverter device 205 can be disposed above and about a hole 210. In at least one specific embodiment, the flow diverter device 205 can be a folded sheet of metal having an apex resembling a tee pee in cross section. The apex can be disposed in line with a centerline of the hole 210, as depicted in FIG. 2. One or more flow diverter devices 205 can be a section of round pipe. The flow diverter devices 205 can be welded or otherwise fixed to the outer surface of the body to prevent polymer granules within the reaction zone 145 (FIG. 1) of the reactor from falling into the holes 210. FIG. 3 depicts an illustrative plan view of the distribution plate 200 with the flow diverter devices or "tee pees" removed.

As mentioned above, polymer growth on the backside, i.e. side facing the hole 210, of the flow diverter device 205 can block or plug the flow of gas through the hole 210. As a result, the olefin monomer cannot properly distribute within the reaction zone 145, and the polymer product can get off spec or polymerization can come to a complete stop. Such polymer growth is often a result of the polymer coating step which sprays a liquid catalyst system into the reactor. The solution catalyst can easily find its way behind the flow diverter device 205 and attach itself thereto especially if the back side is oxidized or rusted. The treatment step, therefore, can treat or passivate the back side of the flow diverter device 205 to eliminate or reduce the presence of metal oxide or hydroxyl groups available for reacting with the solution catalyst compound and, thus, reduce the total amount of polymer produced on the flow diverter devices 205. Any polymer trapped, but not adhered, within the area between the flow diverter device 205 and the plate body can be swept away during polymerization of the product polymer due to the flow of monomer through the distribution plate 200.

Product Catalyst System

The product catalyst system can include Ziegler-Natta catalysts, chromium-based catalysts, metallocene catalysts and other single-site catalysts including Group 15-containing catalysts bimetallic catalysts, and mixed catalysts. The catalyst system can also include $AlCl_3$, cobalt, iron, palladium, chromium/chromium oxide or "Phillips" catalysts. Any catalyst can be used alone or in combination with the others. In one or more embodiments, a "mixed" catalyst is preferred.

The term "catalyst system" includes at least one "catalyst component" and at least one "activator", alternately at least one cocatalyst. The catalyst system can also include other components, such as supports, and is not limited to the catalyst component and/or activator alone or in combination. The catalyst system can include any number of catalyst components in any combination as described, as well as any activator in any combination as described.

The term "catalyst component" includes any compound that, once appropriately activated, is flow diverter deviceable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups are used as in the CRC Handbook of Chemistry and Physics (David R. Lide, ed., CRC Press 81$^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Chromium Catalysts

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Metallocenes

Metallocenes are generally described throughout in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 Metallocene-Based Polyolefins 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

Group 15-Containing Catalyst

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1. In one embodiment, the Group 15-containing catalyst includes a Group 4 imino-phenol complexes, Group 4 bis(amide) complexes, and Group 4 pyridyl-amide complexes that are active towards olefin polymerization to any extent.

Activator

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri (n-butyl)ammonium tetrakis (pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators may be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical Reviews 1347-1374 (2000).

Ziegler-Natta Catalyst

Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S.

Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: MRx, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_{3.1/3}AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof Mixed Catalyst System The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred embodiment, the mixed catalyst includes at least one metallocene catalyst component and at least one non-metallocene component.

Chromium Catalyst System

The chromium-containing catalyst system can be or include one or more chromium-containing catalysts ("CCC"). In one or more embodiments, the solution catalyst system can include silyl chromate. In one or more embodiments, the liquid catalyst system can be or include one or more metallocenes represented by the following structure:

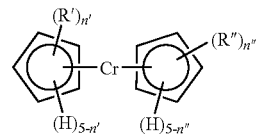

wherein R' and R" are each independently selected from the group consisting of C1 to C20 alkyl;
n' is an integer 0 to 5;
n" is an integer 0 to 5; and
R' and R" are each independently selected from the group consisting of saturated or unsaturated aliphatic, alicyclic, aryl and hetero aryl.

EXAMPLES

The foregoing discussion can be further described with reference to the following non-limiting examples.

Example 1

An iron coupon (1¾"×12") was first exposed to ~6 N HCl, then rinsed with water and left in a hood for 2 days to enhance the surface rust. The coupon was then dried at 80° C. in an oven overnight. The coupon was then placed in a toluene solution containing 100 mgs of chromocene at 85° C. for 1 hr. The coupon was removed from the solution and was rinsed with toluene. The coupon was then exposed to oxygen by immersing the coupon in a beaker of toluene. A gas mixture of 2% oxygen and balance nitrogen was then bubbled through the solution for 10 minutes. The coupon was then dried under purge of nitrogen.

The treated coupon was cut into ¾"×1¾" pieces and was placed into a reactor, 20 mls, and heated to 50° C. 200 micro liters of a 0.5 M triethylaluminum solution in isohexane was added, and the polymerization was run to conversion or a maximum of 6 hours. The resulting polymer coating on the iron substrate ranged from approximately 4 to 20 mils and the activity of the chromocene catalyst ranged from 1000 to 3300 gPE/mole Cr*hr.

The chemisorbed Cr material on the iron coupon resulted in a polymer thickness of 20 mils. These results indicate that a rusty iron surface will react with chromocene yielding an active polymerization catalyst for PE film growth on an iron surface. A Cr-produced PE wall coating, while desirable for commercial reactors, is problematic for the distributor plate in these reactors. Hence, removal of iron hydroxyl moieties ("sites for chromocene chemisorption") on the iron teepees/distributor plate should reduce plate fouling during reactor chromocene treats. Iron hydroxyl site removal can be obtained by passivating a surface to reduce or eliminate hydroxyl group access to the chromocene.

Example 2

516G70 Carbon Steel coupons with varied levels of oxidation were produced in order to show that reducing chemisorbed chromocene on the iron surface results in less polymer formation.

Identically grit-blasted "516 Grade 70" Carbon Steel coupons were placed on a rotating wheel in an open air container with a single feed port for the addition of steam. During the coupon oxidation step, a low rate of steam was fed to the coupons. This provided an atmosphere with excess moisture where the humidity was 100% and a thin layer of moisture condensed on the coupons. The steam rate and nozzle distance were adjusted so that, during the injection of steam, the coupons remained within 15° C. of ambient. Coupons were removed from the vessel at fixed time intervals and immediately dried to inhibit further oxidation. Two coupons were generated for each oxidation exposure time.

All coupons were examined visually and via optical microscopy to qualitatively compare the relative degree of oxidation (i.e., rust formation) for each exposure time. Visual and microscopic examination indicated that each member of each pair of coupons showed very similar levels of oxidation for a given exposure condition. Each exposure condition also exhibited distinctly different levels of visible rust formation between pairs. Both coupons from each pair were then analyzed using a combination of Scanning Electron Microscopy ("SEM") and Energy Dispersive Spectroscopy ("EDS") to arrive at a relative measure of the O/Fe concentration ratio on the coupon surface, by using O/Fe x-ray intensity ratios. These O/Fe intensity ratios serve as a quantitative relative measure of the degree of oxidation for each coupon. Table 1 reports the Coupon ID's, time interval for oxidation, and average O/Fe x-ray peak intensity ratio.

TABLE 1

| Coupon IDs | Time (min) | Average O/Fe Intensity Ratio |
| --- | --- | --- |
| 191 & 192 | 0 | 0.0267 |
| 201 & 202 | 5 | 0.0285 |
| 203 & 204 | 15 | 0.0325 |
| 193 & 194 | 30 | 0.0364 |
| 195 & 196 | 60 | 0.0408 |
| 197 & 198 | 90 | 0.0413 |
| 199 & 200 | 180 | 0.0503 |

Coupons 191, 193, 195, 197, 199, 201, & 203 were cut into smaller pieces to allow the coupons to fit into polymerization equipment. Coupon 191 was cut into two pieces and labeled coupon 191A & 191B. The weights of the cut coupon pieces of interest were as follows: coupon 191A-2.128 grams, coupon 191B-2.401 grams, coupon 201-3.742 grams, coupon 203-3.697 grams, coupon 193-3.651 grams, coupon 195-3.616 grams, coupon 197-3.510 grams, coupon 199-3.310 grams.

Coupons 191A, 191B, 193, 195, 197, 199, 201, & 203 were placed individually in a toluene solution containing 10 mgs of chromocene. The solution was heated to 70° C. for three hours, after which the coupons were removed, rinsed with toluene to remove non-chemisorbed chromocene, and allowed to dry.

Triethyl aluminum (TEAL) was obtained from Akzo Chemicals, Inc. and used without further purification. Polymerization grade hexane was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Polymerizations were conducted in an inert atmosphere ($N_2$) drybox using autoclaves equipped with an external heater for temperature control, glass inserts (internal volume of reactor=22.5 mL), septum inlets, regulated supply of nitrogen, ethylene. The iron coupons, no. 191A, 191B, 193, 195, 197, 199, 201, & 203, with varied rust exposure and treated with chromocene were placed in the reactor glass inserts. The autoclaves were prepared by purging with dry nitrogen.

The reactor was prepared as described above, and then purged with ethylene. The reactors were heated to 50° C. and ethylene was first charged to the reactor. A solution of hexane solution of triethylaluminum containing 11.4 mgs was added to the reactors via syringe.

Ethylene was allowed to enter (through the use of computer controlled solenoid valves) the autoclaves during polymerization to maintain reactor gauge pressure 130 psi (+/−2 psig). Reactor temperature was monitored and typically maintained within +/−1° C. Polymerizations were halted by addition of approximately 400 psig O2/Ar (5 mole % O2) gas mixture to the autoclaves for approximately 30 seconds. The polymerizations were quenched after six hours polymerization time. The reactors were cooled and vented. A polymer film was noted on the coupons after the 6 hour reaction. Yields reported include total weight of polymer. Yields are as follows: Coupon 191A-7.6 mgs PE, 191B-6.9 mgs PE, 193-17.7 mgs PE, 195-21.4 mgs PE, 197-20.4 mgs PE, 199-24.5 mgs PE, 201-16.4 mgs PE, & 203-15.7 mgs PE. Table 2 reports the Coupon ID, oxidation time, average O/Fe x-ray peak intensity ratio, 6 hours PE growth, coupon weight, and normalized PE growth.

TABLE 2

| Coupon ID's | Time (min) | Avg O/Fe Intensity Ratio | 6 hour PE Growth (mg) | HTE Coupon Wt (g) | Normalized PE Growth (mg/g): {PE wt/Coupon wt} |
| --- | --- | --- | --- | --- | --- |
| 191A | 0 | 0.0267 | 7.6 | 2.128 | 3.57 |
| 191B | 0 | 0.0267 | 6.9 | 2.401 | 2.87 |
| 201 | 5 | 0.0285 | 16.4 | 3.742 | 4.38 |
| 203 | 15 | 0.0325 | 15.7 | 3.697 | 4.25 |
| 193 | 30 | 0.0364 | 17.7 | 3.651 | 4.85 |
| 195 | 60 | 0.0408 | 21.4 | 3.616 | 5.92 |
| 197 | 90 | 0.0413 | 20.4 | 3.510 | 5.81 |
| 199 | 180 | 0.0503 | 24.5 | 3.310 | 7.40 |

These experiments clearly demonstrate that the oxidation of a carbon steel surface, such as a reactor distribution plate and flow deflection devices disposed thereon, affects the amount of chemisorbed catalyst (i.e., not-removed by a toluene rinse) such as chromocene-derived moieties, poised for subsequent activation and polymerization. As higher oxidation levels will increase surface area and iron-hydroxyl content for a given surface, these effects contribute to the reaction of $Cp_2Cr$ with $Fe_x$—$O_y$—OH species. Thus, reducing or eliminating iron oxidation and iron hydroxyl concentration on process exposed surfaces will reduce polymer formation resulting from chromocene treatments.

Other embodiments of the invention include

1. A method for gas phase polymerization, comprising: polymerizing one or more olefins at gas phase conditions in a reactor comprising one or more process exposed surfaces in the presence of a catalyst system; and treating at least a portion of the one or more process exposed surfaces prior to injecting the catalyst system to reduce the number of surface hydroxyls or access of the catalyst system to the surface hydroxyls on the process exposed surfaces.

2. The method of paragraph 1, wherein the one or more process exposed surfaces comprises a distributor plate having a plurality of flow paths formed therethrough.

3. The method of paragraphs 1 or 2, wherein the one or more process exposed surfaces comprises an injection nozzle.

4. The method according to any of paragraphs 1 to 3, wherein the one or more process exposed surfaces comprises a flow diverter device disposed on an outer surface of the distributor plate.

5. The method according to any of paragraphs 1 to 4, wherein the catalyst system comprises one or more chromocenes represented by the general structure:

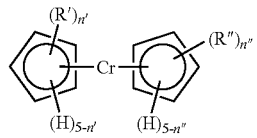

wherein R' and R" are each independently selected from the group consisting of $C_1$ to $C_{20}$ alkyl; n' is an integer 0 to 5; n" is an integer 0 to 5; and R' and R" are each independently selected from the group consisting of saturated or unsaturated aliphatic, alicyclic, aryl and hetero aryl.

6. The method according to any of paragraphs 1 to 5, wherein the one or more olefins comprises an olefinic hydrocarbon having two to eight carbon atoms.

7. The method according to any of paragraphs 1 to 6, wherein the one or more olefins comprises ethylene.

8. The method according to any of paragraphs 1 to 7, wherein the one or more olefins comprises propylene.

9. The method according to any of paragraphs 1 to 8, wherein the one or more olefins comprises ethylene and either butene, hexene, octene, or a combination thereof.

10. The method according to any of paragraphs 1 to 9, wherein the catalyst system comprises a chromocene dissolved or suspended in toluene or hexane, and the one or more olefins are polymerized in the presence of one or more alkyl aluminum compounds.

11. A method for gas phase polymerization, comprising: polymerizing, in a gas phase reactor, one or more olefins in the presence of a catalyst system comprising one or more chromocene catalysts to provide a polymer coating therein; treating one or more process exposed surfaces prior to polymerizing with the catalyst system to reduce or eliminate polymer growth on the treated surface; and polymerizing the one or more olefins in the presence of a metallocene or Ziegler-Natta catalyst system.

12. The method of paragraph 11, wherein treating comprises coating at least a portion of the one or more process exposed surfaces with a metal containing coating or passivating polymer.

13. The method of paragraph 11 or 12, wherein treating comprises applying a hydrocarbon-containing compound to at least a portion of the one or more process exposed surfaces to enable cohesive failure between the polymer coating and the treated surface, wherein the hydrocarbon-containing compound is non-volatile at the gas phase conditions.

14. The method according to any of paragraphs 11 to 13, wherein the hydrocarbon-containing compound consists essentially of a halogen substituted or a silicon-containing hydrocarbon 15. The method according to any of paragraphs 11 to 14, wherein treating comprises polishing at least a portion of the one or more process exposed surfaces to reduce number of oxides thereon.

16. The method according to any of paragraphs 11 to 15, wherein the one or more process exposed surfaces comprises a gas distributor plate having a plurality of flow paths formed therethrough and a flow diverter device disposed on each flow path.

17. The method according to any of paragraphs 11 to 16, wherein the one or more chromocenes are represented by the general structure:

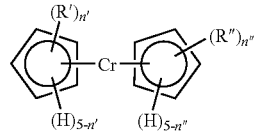

wherein R' and R" are each independently selected from the group consisting of $C_1$ to $C_{20}$ alkyl; n' is an integer 0 to 5; n" is an integer 0 to 5; and R' and R" are each independently selected from the group consisting of saturated or unsaturated aliphatic, alicyclic, aryl and hetero aryl.

18. The method according to any of paragraphs 11 to 17, wherein the one or more olefins comprises an olefinic hydrocarbon having two to eight carbon atoms.

19. The method according to any of paragraphs 11 to 18, wherein the one or more olefins comprises ethylene and optionally butene, hexene, octene, or a combination thereof.

20. The method according to any of paragraphs 11 to 19, wherein the one or more olefins comprises propylene and optionally butene, hexene, octene, or a combination thereof.

21. A distributor plate for gas phase polymerization, comprising:
a body having one or more apertures formed therethrough; and
one or more flow diverter devices disposed on the body, wherein each flow diverter device is disposed above a centerline of each aperture, and at least one surface of each flow diverter device is treated with a passivation layer comprising a zinc containing compound or a hydrocarbon-containing compound that is non-volatile at gas phase conditions.

22. The distributor plate of paragraph 21, wherein the non-volatile, hydrocarbon-containing compound consists essentially of a halogen substituted or a silicon-containing hydrocarbon.

23. The distributor plate of paragraphs 21 or 22, wherein each flow diverter device is cut from a rounded pipe section.

What is claimed is:

1. A method for gas phase polymerization, comprising:
polymerizing one or more olefins at gas phase conditions in a reactor comprising one or more process exposed surfaces in the presence of a catalyst system; and
treating at least a portion of the one or more process exposed surfaces prior to injecting the catalyst system to reduce the number of surface hydroxyls or access of the catalyst system to the surface hydroxyls on the process exposed surfaces, where in the catalyst system comprises one or more chromocene catalysts.

2. The method of claim 1, wherein the one or more process exposed surfaces comprises a distributor plate having a plurality of flow paths formed therethrough.

3. A method for gas phase polymerization, comprising:
polymerizing one or more olefins at gas phase conditions in a reactor comprising one or more process exposed surfaces in the presence of a catalyst system; and
treating at least a portion of the one or more process exposed surfaces prior to injecting the catalyst system to reduce the number of surface hydroxyls or access of the catalyst system to the surface hydroxyls on the process exposed surfaces wherein the one or more process exposed surfaces comprises an injection nozzle.

4. A method for gas phase polymerization, comprising:
polymerizing one or more olefins at gas phase conditions in a reactor comprising one or more process exposed surfaces in the presence of a catalyst system; and
treating at least a portion of the one or more process exposed surfaces prior to injecting the catalyst system to reduce the number of surface hydroxyls or access of the catalyst system to the surface hydroxyls on the process exposed surfaces, wherein the one or more process exposed surfaces comprises a distributor plate having a plurality of flow paths formed therethrough and the one or more process exposed surfaces comprises a flow diverter device disposed on an outer surface of the distributor plate.

5. A method for gas phase polymerization, comprising:
polymerizing one or more olefins at gas phase conditions in a reactor comprising one or more process exposed surfaces in the presence of a catalyst system; and
treating at least a portion of the one or more process exposed surfaces prior to injecting the catalyst system to reduce the number of surface hydroxyls or access of the catalyst system to the surface hydroxyls on the process exposed surfaces, wherein the catalyst system comprises one or more chromocenes represented by the general structure:

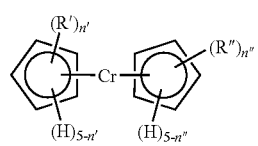

wherein R' and R" are each independently selected from the group consisting of $C_1$ to $C_{20}$ alkyl;
n' is an integer 0 to 5;
n" is an integer 0 to 5; and 24. A method for reducing fouling in a gas phase polymerization reactor, comprising:
treating a bare metal, process exposed surface to reduce the number of accessible hydroxyl groups by 50% or more; and then
polymerizing one or more olefins in the presence of a chromocene at gas phase conditions to provide a polymer coating on untreated process exposed surface surfaces, and optionally on the treated surfaces.

25. The method of paragraph 24, wherein treating the bare metal, process exposed surface comprises coating at least a portion of the surface with a non-iron metal containing coating or passivating polymer.

26. The method of paragraphs 24 or 25, wherein treating the bare metal, process exposed surface comprises applying a non-volatile hydrocarbon containing compound to at least a portion of the surface to enable cohesive failure between the polymer coating and the treated surface.

27. The method according to any of paragraphs 24 to 26, wherein the non-volatile hydrocarbon-containing compound consists essentially of a halogen substituted or a silicon-containing hydrocarbon.

28. The method according to any of paragraphs 24 to 26, wherein treating the bare metal, process exposed surface comprises polishing at least a portion of the one or more process exposed surfaces to remove oxides thereon.

29. The method according to any of paragraphs 24 to 26, wherein the bare metal, process exposed surface comprises a gas distributor plate having a plurality of flow paths formed therethrough and a flow diverter device disposed on each flow path.

30. The method according to any of paragraphs 24 to 26, wherein the chromocene is represented by the general structure:

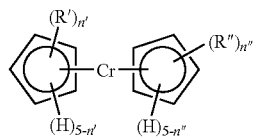

wherein R' and R" are each independently selected from the group consisting of $C_1$ to $C_{20}$ alkyl; n' is an integer 0 to 5; n" is an integer 0 to 5; and R' and R" are each independently selected from the group consisting of saturated or unsaturated aliphatic, alicyclic, aryl and hetero aryl.

31. The method according to any of paragraphs 24 to 26, wherein the one or more olefins comprises an olefinic hydrocarbon having two to eight carbon atoms.

32. The method according to any of paragraphs 24 to 26, wherein the one or more olefins comprises ethylene and optionally butene, hexene, octene, or a combination thereof.

33. The method according to any of paragraphs 24 to 26, wherein the one or more olefins comprises propylene and optionally butene, hexene, octene, or a combination thereof.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

R' and R" are each independently selected from the group consisting of saturated or unsaturated aliphatic, alicyclic, aryl and hetero aryl.

6. The method of claim 1, wherein the one or more olefins comprises an olefinic hydrocarbon having two to eight carbon atoms.

7. The method of claim 1, wherein the one or more olefins comprises ethylene.

8. The method of claim 1, wherein the one or more olefins comprises propylene.

9. The method of claim 1, wherein the one or more olefins comprises ethylene and butene, hexene, octene, or a combination thereof.

10. A method for gas phase polymerization, comprising:
polymerizing one or more olefins at gas phase conditions in a reactor comprising one or more process exposed surfaces in the presence of a catalyst system; and
treating at least a portion of the one or more process exposed surfaces prior to injecting the catalyst system to reduce the number of surface hydroxyls or access of the catalyst system to the surface hydroxyls on the process exposed surfaces, wherein the catalyst system comprises a chromocene dissolved or suspended in toluene or hexane, and the one or more olefins are polymerized in the presence of one or more alkyl aluminum compounds.

11. A method for gas phase polymerization, comprising:
polymerizing, in a gas phase reactor, one or more olefins in the presence of a catalyst system comprising one or more chromocene catalysts to provide a polymer coating therein;
treating one or more process exposed surfaces prior to polymerizing with the catalyst system to reduce or eliminate polymer growth on the treated surface; and
polymerizing the one or more olefins in the presence of a metallocene or Ziegler-Natta catalyst system.

12. The method of claim 11, wherein treating comprises coating at least a portion of the one or more process exposed surfaces with a metal containing coating or passivating polymer.

13. The method of claim 11, wherein treating comprises applying a hydrocarbon-containing compound to at least a portion of the one or more process exposed surfaces to enable cohesive failure between the polymer coating and the treated surface, wherein the hydrocarbon-containing compound is non-volatile at the gas phase conditions.

14. The method of claim 13, wherein the hydrocarbon-containing compound consists essentially of a halogen substituted or a silicon-containing hydrocarbon.

15. The method of claim 11, wherein treating comprises polishing at least a portion of the one or more process exposed surfaces to reduce number of oxides thereon.

16. The method of claim 11, wherein the one or more process exposed surfaces comprises a gas distributor plate having a plurality of flow paths formed therethrough and a flow diverter device disposed on each flow path.

17. The method of claim 11, wherein the one or more chromocenes are represented by the general structure:

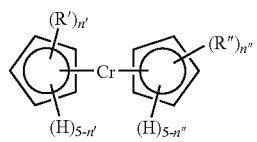

wherein R' and R" are each independently selected from the group consisting of $C_1$ to $C_{20}$ alkyl;
n' is an integer 0 to 5;
n" is an integer 0 to 5; and
R' and R" are each independently selected from the group consisting of saturated or unsaturated aliphatic, alicyclic, aryl and hetero aryl.

18. The method of claim 11, wherein the one or more olefins comprises ethylene and optionally butene, hexene, octene, or a combination thereof.

19. A distributor plate for gas phase polymerization, comprising:
a body having one or more apertures formed therethrough; and
one or more flow diverter devices disposed on the body, wherein each flow diverter device is disposed above a centerline of each aperture, and at least one surface of each flow diverter device is treated with a passivation layer comprising a zinc containing compound or a hydrocarbon-containing compound that is non-volatile at gas phase conditions.

20. The distributor plate of claim 19, wherein the non-volatile, hydrocarbon-containing compound consists essentially of a halogen substituted or a silicon-containing hydrocarbon.

21. A method for reducing fouling in a gas phase polymerization reactor, comprising:
treating a bare metal, process exposed surface to reduce the number of accessible hydroxyl groups by 50% or more; and then
polymerizing one or more olefins in the presence of a chromocene at gas phase conditions to provide a polymer coating on untreated process exposed surfaces, and optionally on the treated surfaces.

22. The method of claim 21, wherein treating the bare metal, process exposed surface comprises coating at least a portion of the surface with a non-iron metal containing coating or passivating polymer.

23. The method of claim 21, wherein treating the bare metal, process exposed surface comprises applying a non-volatile hydrocarbon containing compound to at least a portion of the surface to enable cohesive failure between the polymer coating and the treated surface.

24. The method of claim 23, wherein the non-volatile hydrocarbon-containing compound consists essentially of a halogen substituted or a silicon-containing hydrocarbon.

25. The method of claim 21, wherein the bare metal, process exposed surface comprises a gas distributor plate having a plurality of flow paths formed therethrough and a flow diverter device disposed on each flow path.

26. The method of claim 3, wherein the one or more olefins comprises ethylene and optionally butene, hexene, octene, or a combination thereof.

27. The method of claim 4, wherein the one or more olefins comprises ethylene and optionally butene, hexene, octene, or a combination thereof.

28. The method of claim 5, wherein the one or more olefins comprises ethylene and optionally butene, hexene, octene, or a combination thereof.

29. The method of claim 10, wherein the one or more olefins comprises ethylene and optionally butene, hexene, octene, or a combination thereof.

30. The method of claim 1, wherein the one or more process exposed surfaces comprises an injection nozzle.

31. The method of claim 30, wherein the one or more process exposed surfaces comprises a flow diverter device disposed on an outer surface of the distributor plate.

32. The method of claim 1, wherein the one or more process exposed surfaces comprises a flow diverter device disposed on an outer surface of the distributor plate.

33. The method of claim 1, wherein the catalyst system comprises a chromocene dissolved or suspended in toluene or hexane, and the one or more olefins are polymerized in the presence of one or more alkyl aluminum compounds.

* * * * *